United States Patent Office 3,634,540
Patented Jan. 11, 1972

3,634,540
PROCESS FOR THE ISOMERIZATION OF OLEFINS
Jin-liang Wang, Akron, Ohio, assignor to The Goodyear Tire & Rubber Company, Akron, Ohio
No Drawing. Filed Oct. 13, 1969, Ser. No. 866,038
Int. Cl. C01c 5/24
U.S. Cl. 260—683.2
6 Claims

ABSTRACT OF THE DISCLOSURE

There is disclosed a process comprising isomerizing branched and straight chain olefins to form isomers having their carbon-to-carbon double bond in a more internally located position by subjecting such olefins to isomerization conditions to a tungsten complex compound corresponding to the formula $L \cdot W(CO)_{a-b}$ wherein L is an unsaturated hydrogen compound having at least two carbon-to-carbon double bonds and where "a" is a whole number representing the valence of the tungsten metal and "b" is a whole number corresponding to the whole number of carbon-to-carbon bonds in L capable of forming coordinate bonds with the tungsten metal.

---

This invention relates to the isomerization of hydrocarbons and particularly to the isomerization of olefins. It relates to catalysts employed to shift the double bonds and olefinic hydrocarbons to a more internally located position. It also relates to a unique process for the isomerization of both normal and branch chained olefins.

In certain uses it is quite often preferred to use olefins which have internal double bonds as opposed to external or terminal double bonds. Processes for shifting double bonds are well-known. However, some, if not all, of these prior art isomerization processes produce results and/or side effects which are often undesirable. For example, some of these prior art processes tend to promote catalytic polymerization and/or catalytic degradation of either the reactant or the product of the isomerization. Still others produce or promote side reactions of the reactant and/or the product of the isomerization to form unwanted end products and thereby result in low efficiencies and problems in separation, and for this reason are uneconomical. Still others of these processes suffer from low conversions and others cause unfavorable equilibrium between the reactant and the desired product.

Therefore, it is an object of this invention to provide a process for the catalytic isomerization of both branch and straight chain olefins to form isomers which have their double bond in a more internal position. Another object is to provide a process which possesses high selectivity of the desired isomeric form of the olefin. Other objects will appear as the description proceeds.

According to the present invention, both normal and branch chain olefins can be isomerized by means of a tungsten complex compound corresponding to the formula $L \cdot W(CO)_{a-b}$ wherein L is an unsaturated hydrocarbon compound having at least two carbon-to-carbon double bonds and where L is attached to the transition metal by coordination through two carbon-to-carbon double bonds, W is tungsten, C is carbon, O is oxygen, and where "a" is a whole number representing the valence of the tungsten metal and "b" is a whole number corresponding to the number of carbon-to-carbon double bonds in L capable of forming coordinate bonds with the tungsten metal.

As was stated previously, the ligand L is defined as an unsaturated hydrocarbon compound having at least two carbon-to-carbon double bonds. L can be further defined as unsubstituted or alkaryl or aralkyl substituted cycloalkylpolyenes and polycycloalkylpolyenes compounds having two or more carbon-to-carbon double bonds capable of forming two or more coordinate bonds with the transition metal, tungsten.

The tungsten complex compounds useful in the isomerization process of the present invention are usually prepared by refluxing a desired unsaturated hydrocarbon compound with a tungsten carbonyl compound. Representative examples of the tungsten complex compound of the present invention include 1,5-cyclooctadiene-tungsten tetracarbonyl; norbornadiene-tungsten tetracarbonyl; dicyclopentadiene-tungsten tetracarbonyl; cycloheptatriene-tungsten tricarbonyl; 1,3,5-cyclooctatriene-tungsten tricarbonyl; cyclooctatetrene-tungsten tricarbonyl; 6-dimethylaminofulvene-tungsten tricarbonyl; 1,3-cyclohexadiene-tungsten dicarbonyl and the like.

The isomerization reactions of the present invention are preferably carried out as solution isomerizations in such solvents as aliphatic, cycloaliphatic and aromatic hydrocarbons. Representative examples of such solvents include pentane, hexane, cyclohexane, cyclooctane, benzene, toluene and the like. Although solution isomerization techniques are preferred, bulk isomerization techniques are also operable.

The temperatures which may be employed to isomerize olefins in accordance with this invention are conventional isomerization temperatures and can range from a low of about 0° C. to as high as about 300° C. In this regard it has been found that the preferred isomerization temperature range is from about 115° C. to about 265° C. Furthermore, it has been found that within this temperature range the selectivity of the isomerization reaction of a particular olefin to give a particular, more desired olefin having a more internally located double bond ranges from about 90 percent to about 100 percent.

The amount of catalyst employed in the practice of this invention can vary over a wide range depending upon the particular olefin employed, the purity and concentration of the olefin and the temperature at which the isomerization reaction is carried out. Normally, however, the mole ratio of the olefin to the tungsten complex compound ranges from about 50 to about 2000 with a preferred mole ratio ranging from about 50 to about 500.

As stated above, solution isomerization is the preferred technique in the practice of this invention. Therefore, superatmospheric pressures must be employed to keep the reactants in the liquid phase at the most desirable temperature.

The olefins which may be isomerized by the catalysts of this invention include both normal and branched chain olefins which boil in a reasonable boiling range and include olefins containing from four carbon atoms to those containing about 18 to 20 carbon atoms. Thus, butene-1, pentene-1, hexene-1, and hexene-2 and the like may be converted to olefins containing more internal double bond such as butene-2, pentene-2, hexene-3 and the like. Representative examples of simple branch chain olefins include 2-methylbutene-1, 4-methylpentene-1 and the like which may be converted to 2-methylbutene-2, 4-methylpentene-2 and the like. One particularly interesting embodiment of this invention is the isomerization of 2-methylpentene-1 to 2-methylpentene-2, a precursor of isoprene. Various other mono-substituted olefins containing up to about 20 carbons may also be isomerized in accordance with this invention. Dialkyl substituted olefins representative of which is 2,3-dimethylbutene-1, etc. may also be isomerized as well as trialkyl substituted olefins, representative of which is 2,2,3-trimethylpentene-1, may also be employed in the practice of this invention. Olefins containing alkyl substituents with more than one carbon atom are contemplated to be within the scope of this invention. Representative of such olefins are 3-ethyl-pentene-1, 3-ethylhexene-1 and the like. All of these olefins can be isomerized to produce their isomeric form which have a more internal double bond. It is believed that those skilled in the art to which this invention is directed will be able to determine the extent and scope of the olefins which may be employed in this invention as well as the specific conditions required to shift the double bond of the particular olefin employed.

Further practice of this invention is illustrated by reference to the following examples which are intended to be illustrative and in no manner limiting. Unless otherwise noted, all percentages are reported by area as determined by gas liquid chromatography on the reaction mixtures both before and after the isomerization reaction has taken place.

EXAMPLE I

All experiments were carried out in a reaction system composed of two stainless steel pressure vessels connected by means of a section of stainless steel tubing. One pressure vessel was employed as a reaction chamber and the other as a mixing chamber. Each chamber had a capacity of 30 milliliters. The catalyst system employed was a 0.01 molar (M) solution of 1,5-cyclooctadiene-tungsten tetracarbonyl [COD·W(CO)$_4$] complex in dry benzene. The olefins, 2-methyl-1-butene (2M1B) and 2-methyl-2-butene (2M2B) were combined in equal mole quantities (2M1B/2M2B=1) in anhydrous normal pentane. This solution was 1.3 M with respect to each olefin.

To the pressure vessel employed as the mixing chamber were added 4.0 ml. of the 0.01 M COD·W(CO)$_4$ catalyst solution and 1.54 ml. of the olefin solution and the mixture thoroughly agitated. The pressure vessel, employed as the reaction chamber, was then heated to the desired temperature and the contents of the mixing chamber pressured by nitrogen into the reaction chamber. All reactions were carried out for 15 minutes, cooled and analyzed for isomerization products on a gas liquid chromatograph. All results are given in Table I below. The mole ratio of olefin to catalyst (C$_5$/W) was 50/1 for all experiments.

TABLE I

| Run No. | Temp., °C. | Pressure (p.s.i.g.) | Percent conversion of 2M1B | Percent 2M2B formed | Percent other a |
|---|---|---|---|---|---|
| 1 | 25 | 0 | | | |
| 2 | 160 | 720–440 | 73 | 98 | 2 |
| 3 | 115 | 640–380 | 62 | 100 | 0 |
| 5 | 160 | 680–440 | 68 | 96 | 4 |
| 6 | 200 | 610–400 | 65 | 90 | 10 |
| 7 | 175 | 560–380 | 72 | 90 | 10 | a Higher hydrocarbons.

EXAMPLE II

An experiment was performed similar to those carried out in Example I above with the exception that no catalyst was employed. The reaction was run at 160° C. for 15 minutes. There occurred only a 5 percent conversion of 2-methyl-1-butene. The 5 percent conversion product contained 53 percent of the 2-methyl-2-butene and 47 percent of higher hydrocarbons.

EXAMPLE III

A series of experiments was carried out similar to Example I above except that 1-pentene was substituted for the 2-methyl-1-butene and 2-methyl-2-butene employed in Example I. The same 0.01 M COD·W(CO)$_4$ catalyst was employed and all experiments were run for 15 minutes. Table II below sets forth all pertinent data. Column 1 sets forth number of the experiment, column 2 the temperature at which the experiment was carried out, column 3 the pressure under which it was run, column 4 the percent conversion of pentene-1, column 5 the percent of pentene-2 formed and column 6 sets forth the percentage of higher hydrocarbons formed.

TABLE II

| Run No. | Temp., °C. | Pressure (p.s.i.g.) | Percent conversion of pentene-1 | Percent pentene-2 formed | Percent other 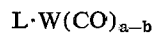 |
|---|---|---|---|---|---|
| 1 | 115 | 660–390 | 28 | 95 | 5 |
| 2 | 160 | 640–400 | 51 | 99 | 1 |
| 3 | 215 | 690–450 | 63 | 98 | 2 |
| 4 | 240 | 680–460 | 62 | 100 | 0 |
| 5 | 265 | 600–460 | 55 | 99 | 1 | a Higher hydrocarbons.

While certain representative embodiments and details have been shown for the purpose of illustrating the invention, it will be apparent to those skilled in this art that various changes and modifications may be made therein without departing from the spirit or scope of the invention.

What is claimed is:

1. A method for shifting the double bonds of branched and straight chain olefins containing from 4 to 20 carbon atoms to more internally located positions which comprises subjecting said branched and straight chain olefins to temperatures ranging from 115° C. to 265° C. in the presence of a catalyst system comprised of a tungsten complex compound corresponding to the formula $$L \cdot W(CO)_{a-b}$$

wherein L is an unsaturated hydrocarbon compound selected from the group consisting of unsubstituted and alkaryl and aralkyl substituted cycloalkylpolyenes and polycycloalkylpolyenes having at least two carbon-to-carbon double bonds and wherein L is attached to the transition metal by coordination through two or more carbon-to-carbon double bonds, W is tungsten, C is carbon, O is oxygen and where "$a$" is a whole number representing the valence of the tungsten metal and "$b$" is a whole number corresponding to the number of carbon-to-carbon double bonds in L capable of forming coordinate bonds with the tungsten metal.

2. A process according to claim 1 wherein the preferred mole ratios of olefin to tungsten complex compound ranges from about 50 to about 500.

3. A process according to claim 1 wherein the selectivity of the isomerization reaction of a particular olefin to give a particular, more desired internal olefin ranges from about 90 percent to about 100 percent.

4. A process according to claim 1 wherein the tungsten complex compound is 1,5-cyclooctadiene tungsten tetracarbonyl.

5. A method of producing 2-methylpentene-2 from 2-methylpentene-1 which comprises contacting a catalyst comprising 1,5-cyclooctadiene tungsten tetracarbonyl with 2-methylpentene-1 at temperatures ranging from about 115° C. to about 265° C. and at superatmospheric pressures and in the substantial absence of water, to shift the double bond in said 2-methylpentene-1 to a more internally located position, thereby forming 2-methylpentene-2.

6. A method of producing 2-methylbutene-2 from 2-methylbutene-1 which comprises contacting a catalyst comprising 1,5-cyclooctadiene-tungsten tetracarbonyl with 2-methylbutene-2 at temperatures ranging from about 115° C. to about 265° C. and at superatmospheric pressures and in the substantial absence of water, to shift the double bond in said 2-methylbutene-1 to a more internally located position, thereby forming 2-methylbutene-2.

References Cited
UNITED STATES PATENTS

| | | | |
|---|---|---|---|
| 3,268,617 | 8/1966 | Menapace | 260—683.2 |
| 3,463,828 | 8/1969 | Crain | 260—666 A |
| 3,083,246 | 3/1963 | Holzman | 260—683.15 |

DELBERT E. GANTZ, Primary Examiner

V. O'KEEFE, Assistant Examiner

U.S. Cl. X.R.

260—666 A